UNITED STATES PATENT OFFICE.

JOSEPH GANDOLFO, OF NEW YORK, N. Y.

DEPURATED COMPOSITE SUGAR, &c.

SPECIFICATION forming part of Letters Patent No. 296,326, dated April 8, 1884.

Application filed March 13, 1882. (Specimens.)

*To all whom it may concern:*

Be it known that I, JOSEPH GANDOLFO, of the city, county, and State of New York, have made an invention of a new article of manufacture of Depurated Composite Sugar, and of the process of manufacturing the same, and I do hereby declare that the following is a full, clear, and exact description and specification of the same.

There are two kinds of concrete sugar well known to the dealers and users, and called, respectively, "cane-sugar," and "grape-sugar." Each of these kinds of sugar has certain characteristics which are peculiar to it, and which adapt it to certain uses better than the other kind. Thus, when mere flavor is required, cane-sugar is preferred; but when dense sirups or sweetmeats, which require much sugar to enable them to keep, are made with cane-sugar, they are apt to candy by reason of the crystallization of the sugar. Grape-sugar, on the other hand, is practically free from the tendency to candy when made into sirup with or without the juices of fruit; but it lacks the peculiar flavor which characterizes cane-sugar.

The manufacture which constitutes the subject-matter of one part of my invention is a depurated composite sugar, combining the desirable qualities of both the kinds of sugar above described, and the other part of my invention consists of the process of manufacturing the same. Previous to my present invention I attempted to manufacture a composite sugar by mixing together the ordinary cane-sugars and grape-sugars then found in the market; but I soon found that the mixture of these was a practical failure, as it was an unstable compound which speedily spoiled and became unsalable. I subsequently discovered that the spoiling of the compound was due to moisture and the presence of chloride of calcium, which was an ingredient of the ordinary grape-sugar of that date, and that when a dry compound of the two sugars was made which was practically free of chloride of calcium, (which is a deliquescent or hygrometric salt,) the composite sugar depurated of the deliquescent salt was a stable merchantable article. This depurated compound of cane-sugar and grape-sugar constitutes the first part of my invention. In order that the whole of my invention may be understood, I will proceed to describe the process by which and the manner in which I have manufactured my said depurated composite sugar.

I make use, by preference, of cane-sugars of the softer varieties, commonly known as "coffee-sugars," and I use grape-sugar which is practically free of chloride of calcium or other deliquescent or hygrometric salt. The grape-sugar which I have used with success is made from corn-starch and containing about eighty per cent. of pure saccharine matter, about five per cent. of dextrine, and about fifteen per cent. of water and ash, without a deliquescent or hygrometric salt. The grape-sugar is obtained from the manufacturer in the form of large cakes. These are submitted to the action of a shaving-machine, such as that used for cutting tobacco and similar articles, and containing a series of revolving knives, by means of which the grape-sugar is shaved off in thin scales of about one fifteen-hundredth of an inch in thickness. The scales, as they drop from the shaving-machine in a more or less broken condition, are subjected to a vibrating screen of wire-cloth made of No. 19 wire, four meshes to the inch, by which the scales are further disintegrated and sifted. The material which passes through the said screen is subjected to the action of a revolving screen of wire-cloth made of No. 26 wire, nine meshes to the inch, by means of which the material is sifted a second time. Next, the sifted material is dried, and I prefer to dry it by agitation in a current of hot air. For this purpose I employ a revolving cylinder of about four and a half feet in diameter and twenty-five feet in length, set with one of its ends about two feet higher than the other. The drying-cylinder is fitted at its interior with floats projecting inward from its internal surface, and with knockers or hammers at its exterior, so that it may be automatically jarred while revolving. A current of air heated to a temperature of about 120° Fahrenheit is introduced at the upper end of the drying-cylinder and escapes at its lower end, the air being introduced by a fan or other means at so slow a speed that it will not blow the fine sugar out of the drier. The fine sugar is introduced at the upper end of the drier, and as it revolves is carried up by the floats, and is dropped through the current of air after each raising progressively nearer the delivery or lower end of the drier, so that it is delivered from the drier in a practically dry state. While the operation progresses the adhesion of the powder to the drier is prevented by the jarring produced by the knockers. After the drying I prefer to cool the dried and powdered grape-sugar by subjecting it to the action of a second machine similar to the drier, but supplied with a current of air artificially cooled, (by being passed through pipes surrounded by ice, or by other means,) so as to cool the fine dried sugar rapidly to the atmospheric temperature or lower. In this fine, dry, cool condition the grape-sugar is mixed with the coffee (cane) sugar in the desired proportions. The mixture may be made by any suitable means operated by hand or by power. We prefer to effect the mixture by means of a revolving rake operated by power, and similar to the hopper-boy of a flouring-mill, so that the mixture is intimate. The mixture completes the article, which is then ready for being packed into barrels or other packages in the usual mode practiced in packing powdered or coffee sugars.

In the shaving operation the material frequently breaks in advance of the knives, hence more or less coarse granular grape-sugar is obtained as tailings from the sifting-machines. Such tailings are, by preference, remelted and cast into cakes. The proportions in which the ingredients are mixed may be varied as found expedient. The proportions which I deem the best are one hundred parts, by weight, of coffee-sugar, and thirty-five parts, by weight, of the dry grape-sugar.

While I prefer coffee-sugar as the cane-sugar ingredient of my composition, the invention is not restricted to it, as granulated cane-sugar may be used for the purpose, and cane-sugar in lumps may be used, provided it be reduced to powder by crushing or grinding, or by both these operations, before it is compounded with the grape-sugar.

The process above described comprises the operations of shaving the grape-sugar, sifting it, drying it, and mixing it in a fine dry condition with the fine cane-sugar, with, by preference, the modification of artificially cooling the grape-sugar previous to the mixture.

The construction of the apparatus and the order of operations above described may be varied, as circumstances or the views of different operators may require. Thus, when I wish to prepare grape-sugar to be compounded with granulated cane-sugar, I prefer to have the second sieve clothed with wire-cloth made of No. 26 wire, twelve meshes to the inch. I deem it, however, essential, to the invention that the compound of the two kinds of sugar should contain so small a percentage of water that it does not become lumpy by keeping under the ordinary conditions to which sugar is subjected during transportation and storage for sale; and I have found by experiment that when the grape-sugar above described by me is dried so that it contains only about ten per cent. of water, this condition is fulfilled. It is, however, desirable that the percentage of water should be less than ten per cent., and I have found no difficulty in reducing it to as low as four per cent. by the mode above described. In place of cooling the dried grape-sugar previous to mixing it with the cane-sugar, the two may be mixed before drying either; or they may be mixed while the grape-sugar is warm; and the mixture may then be cooled, as previously described. Instead of compounding the two ingredients after they have been reduced to a fine state, the compounding may be effected by using the cane-sugar as an induction material for the concretion of the grape-sugar. In this case the cane-sugar in a fine state is introduced into the crystallizing-vat containing the grape-sugar in a liquid condition and free of a deliquescent salt, and is thoroughly beaten up with the latter by a mechanical agitator. Then the mixture is run into molds and permitted to concrete. The cakes thus produced should be reduced by a shaving-machine, as before described, and the reduced material should be sifted and artificially dried, and preferably cooled, substantially as before described. The invention is not restricted to a grape-sugar containing precisely five per cent. of dextrine and eighty per cent. of pure saccharine matter, as sugars containing these materials in different proportions will answer the purpose. As a general rule, however, the lower the percentage of dextrine and the larger the percentage of pure saccharine matter the better is the grape-sugar as an ingredient for my new manufacture.

I do not claim in this patent any of the mechanism above described by me, but propose to secure by another patent whatever is new therein.

I claim as my invention—

1. As a new article of manufacture, the depurated composite sugar above described, compounded of cane-sugar and grape-sugar which has been liberated of its deliquescent salt and then reduced by shaving, substantially as specified.

2. The process of manufacturing composite sugar, substantially as before set forth, consisting of the shaving of grape-sugar, the sifting it, the drying it, and the mixing it with cane-sugar.

3. The process of manufacturing composite sugar, substantially as before set forth, consisting of the shaving of grape-sugar, the sifting it, the drying it, the artificially cooling it, and the mixing it with cane-sugar.

Witness my hand this 2d day of March, A. D. 1882.

JOSEPH GANDOLFO.

Witnesses:
EDW. R. BREVOORT,
W. L. BENNEM.